(No Model.)
A. W. SMITH.
METHOD OF CONSTRUCTING ARMATURE CORES FOR ELECTRIC MOTORS OR DYNAMOS.
No. 492,244. Patented Feb. 21, 1893.
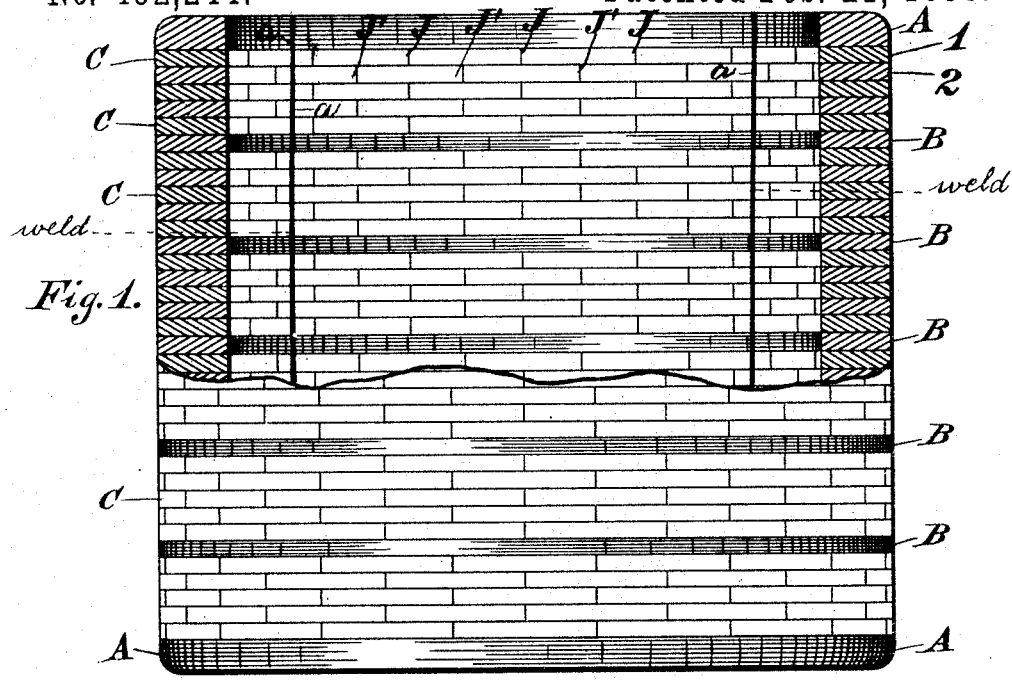
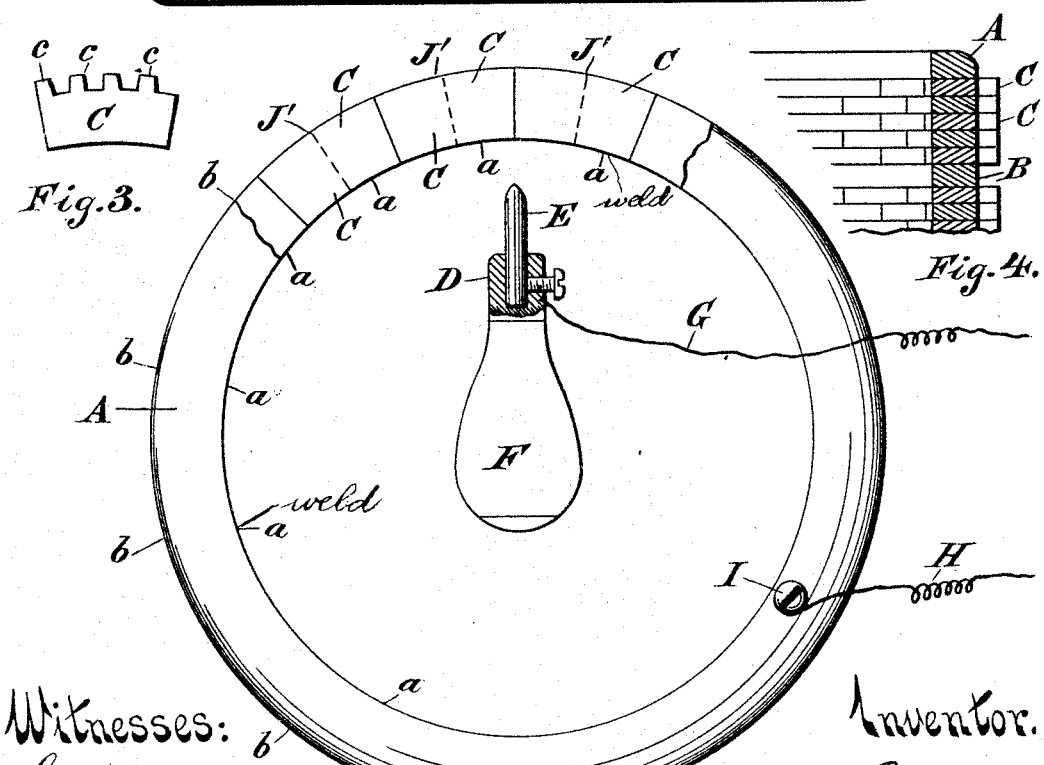
Witnesses:
Geo. W. Ueffinger.
F. Weegmann
Inventor.
A. W. Smith

UNITED STATES PATENT OFFICE.

ALBERT W. SMITH, OF SAN FRANCISCO, CALIFORNIA.

METHOD OF CONSTRUCTING ARMATURE-CORES FOR ELECTRIC MOTORS OR DYNAMOS.

SPECIFICATION forming part of Letters Patent No. 492,244, dated February 21, 1893.

Application filed February 20, 1892. Serial No. 422,282. (No specimens.)

*To all whom it may concern:*

Be it known that I, ALBERT W. SMITH, a citizen of the United States, residing at San Francisco, in the county of San Francisco and State of California, have invented a new and Improved Method of Making Armature-Cores for Electric Motors or Dynamos, of which the following is a specification.

The object of my invention is to construct an armature core of sectors of rings without the use of bolts or other clamping devices commonly employed.

To this end it consists in building up an armature core of sectors of sheet iron and continuous end and intermediate rings, and then welding them together at the points of least magnetic flow by means of the electric arc, or other suitable means.

In the drawings herewith Figure 1 is an elevation partly in section, Fig. 2 is an end view also partly in section, Fig. 3 is a detail view. Fig. 4 shows the method pursued in building up a core with projecting teeth.

Like letters and numerals in all views refer to like parts.

A A, are continuous end rings.

B B B, are continuous intermediate rings.

C C C are sheet iron sectors built up between the rings A A and B B B.

D is a carbon holder adapted to hold carbon E, and secured to handle F, the wire G connects with holder D, and wire H is connected by means of screw I to the ring A.

In the present practice of making ring armature cores there are two methods pursued, one consists in punching rings of the required size from sheet iron and stringing them onto a suitable spider, by this method a great deal of iron is wasted, it also involves the use of expensive machinery, and skilled labor.

The other method consists in punching sectors from sheet iron and bolting them together between end rings by means of bolts passed through the sectors, this method involves a great deal of highly skilled labor, and as the bolts form conducting paths of low resistance, a very inefficient armature core is obtained in this way. To obviate these defects and provide a cheap method of construction, I punch the sectors C C C from sheet iron and build them up in a suitable manner between the continuous rings B B B and end rings A A, so that the joints between succeeding sectors will alternate or break joints with those on each side thereof as shown in Fig. 2 by dotted lines J' J' J', which indicate the junction lines of the next layer of sectors below that of sectors C C C Fig. 2. This is also clearly shown in Fig. 1 where the junction lines J J J of sectors C in layer 1 alternate or break joints with junction lines J' J' J' of layer 2. Suitable insulating material: as paper, varnish, &c., is also placed between the successive layers as the work proceeds. I now weld fuse or burn the entire mass together by means of the electric arc, applied as follows, to the handle F is secured the holder D, clamping carbon E, connected by means of wire G with a source of electric current, the other pole of which connects with end ring A by means of wire H. If now the carbon E be brought into contact with the ring A at any point the circuit is closed, and when withdrawn a short distance the electric arc is formed and heat developed in proportion to the strength of current flowing. By passing the carbon E from end to end of the armature core the sectors C C C, rings A A, and B B B, are welded together at points in the path of the arc from end to end of the core, the welds are formed at equidistant intervals around the entire inner periphery as indicated by letters $a$ $a$ $a$.

As the welds are on the inner periphery, and do not extend into the body of the core, and as no lines of force are cut by the inner surface, therefore no energy is wasted by inducing currents in the welds, as is the case when bolts are used and pass through the body of the core. The welds may therefore be made as numerous as is consistent with the requisite strength.

When the armature core is to be used in connection with internal inducing magnets the welds are formed on the outer surface at points indicated by letters $b$ $b$ $b$. Or in cases where great strength is required the entire outer or inner surface of the core can be welded together.

In Fig. 4 is shown the method pursued in making toothed ring armatures, the sectors C C C are provided with teeth $c$ $c$ $c$, as shown in Fig. 3, and the end rings A A, and intermediate rings B B B are made of a diameter corresponding with the bottom of the teeth $c\ c\ c$, by this means the notching of rings A A and B B is obviated, and much labor is saved.

Having now fully described my invention, I will state that various modifications thereof are possible, for instance; the end and intermediate rings A A, and B B B may be discarded, and the entire armature body be made up of sectors C C C. Also a process of brazing or soldering involving the use of the electric arc may be substituted for the welding process described. A gas or other blow pipe flame may also be used in lieu of the electric arc, and with substantially equal results.

My invention is also applicable to the construction of laminated magnet cores, and to cores for transformers and induction coils.

What I therefore claim as my invention is—

1. The process of making magnetic cores, which consists in building up the same of plates or parts, and surface welding the same together at the points or paths of least magnetic flow or cutting, as set forth.

2. The process of making magnetic cores, which consists in building up the same of plates or parts, and surface welding the same together at the points or paths of least magnetic flow or cutting by means of the electric arc, as set forth.

3. The process of making armature cores, which consists in building up the same of plates or parts, and continuous end and intermediate rings, and surface welding the same together at equidistant points on the inner periphery, by means of the electric arc, as set forth.

4. The method of making toothed armature cores, which consists in building up the same of toothed plates or parts, and continuous end and intermediate rings of a diameter corresponding with the bottom of the teeth, and surface welding the same together by means of the electric arc, as set forth.

ALBERT W. SMITH.

Witnesses:
T. WEEGMANN,
GEO. W. UEFFINGER.